Aug. 4, 1931.　　　　　R. T. KNAPP　　　　　1,817,315
MEANS FOR TRANSMISSION OF FORCE BY LIQUID PRESSURE
Original Filed June 11, 1928　　2 Sheets-Sheet 1
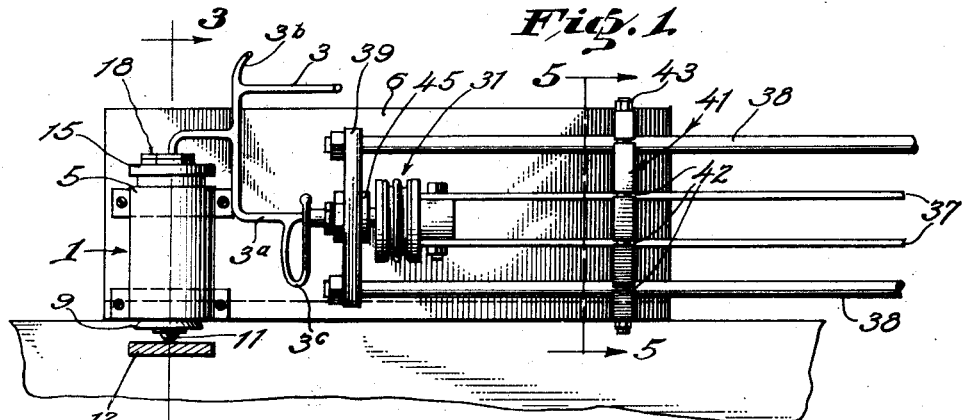
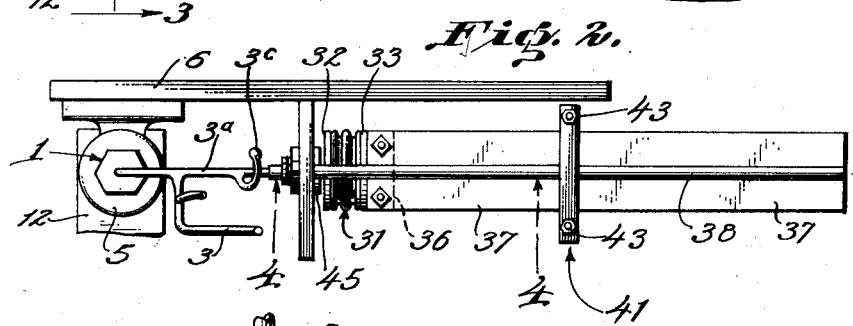
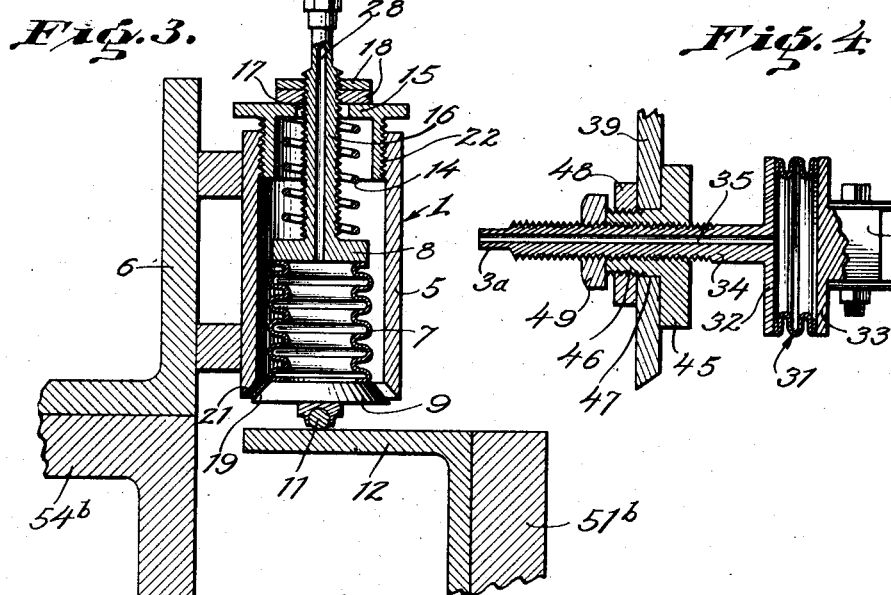
INVENTOR
Robert T. Knapp
BY
ATTORNEYS Aug. 4, 1931.  R. T. KNAPP  1,817,315
MEANS FOR TRANSMISSION OF FORCE BY LIQUID PRESSURE
Original Filed June 11, 1928  2 Sheets-Sheet 2
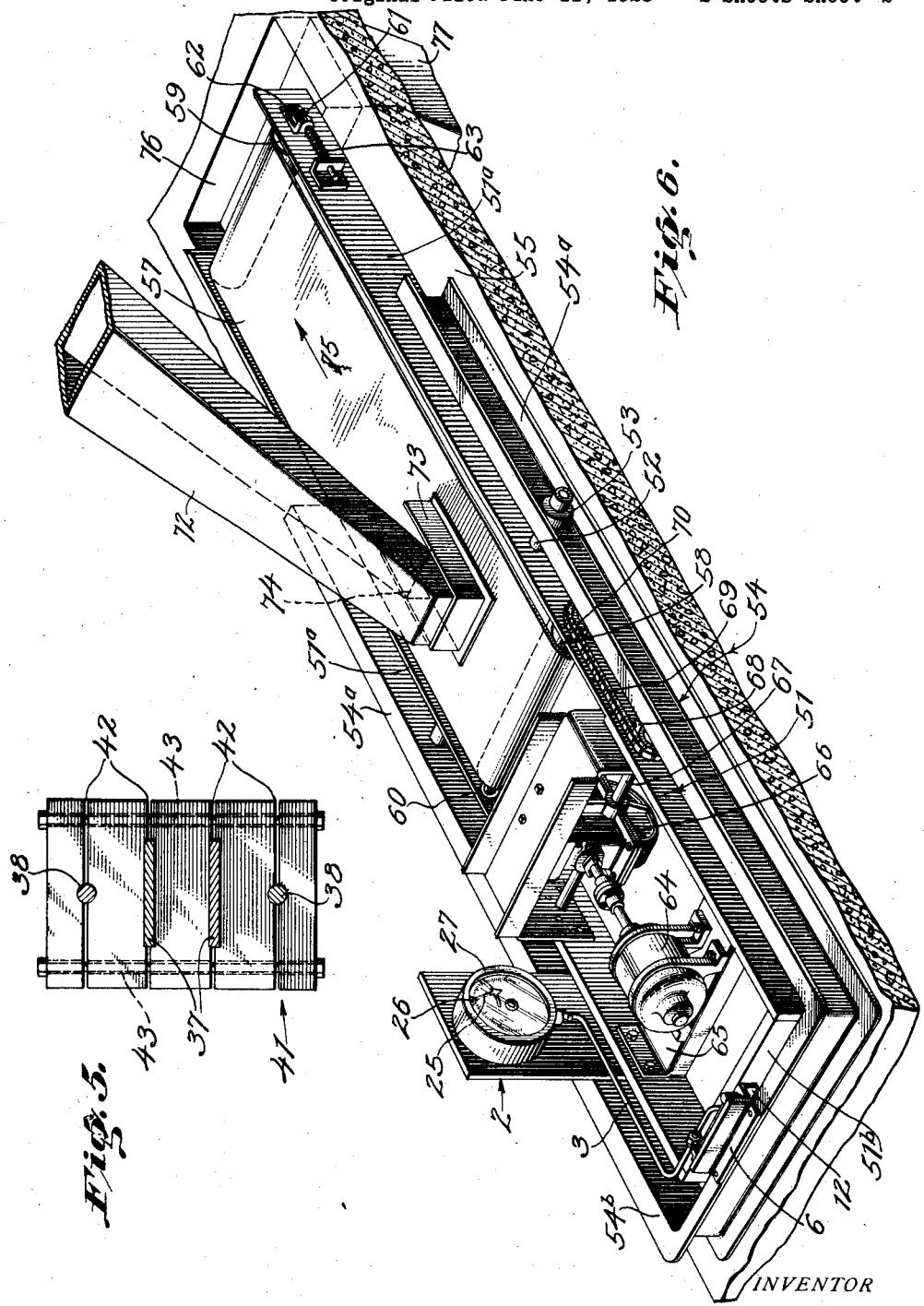
INVENTOR
Robert T. Knapp
BY Arthur P. Knight and Alfred W. Knight
ATTORNEYS Patented Aug. 4, 1931

1,817,315

UNITED STATES PATENT OFFICE

ROBERT T. KNAPP, OF RIVERSIDE, CALIFORNIA, ASSIGNOR TO RIVERSIDE CEMENT COMPANY, OF LOS ANGELES, CALIFORNIA, A CORPORATION OF DELAWARE

MEANS FOR TRANSMISSION OF FORCE BY LIQUID PRESSURE

Original application filed June 11, 1928, Serial No. 284,316. Divided and this application filed September 14, 1929. Serial No. 392,667.

This application is a division of my application Ser. No. 284,316, filed June 11, 1928 for "Apparatus for continuous weighing of materials". The claims of the parent application are directed entirely to continuous weighing means. Force transmitting means of the type herein described and claimed are shown and described in the parent application, for use in obtaining a measurement of the weight, and are included in some of the claims. The claims of this divisional application, on the other hand, are restricted entirely to the force transmitting means itself, without regard to the use to which the same is put.

This invention relates to the transmission of mechanical force or power by the agency of liquid pressure and is particularly adapted for use in connection with the employment of liquid pressure systems for measuring mechanical forces of various kinds, such as weight, pressure, or the like. The principal object of the invention is to provide means for automatically compensating for variations in temperature of the liquid utilized for transmission of the force.

The pressure in a confined liquid affords a very convenient and accurate means for transmission of a certain mechanical force from one point to another. However, it has been found that variations in temperature seriously affect the results obtained, on account of the tendency of the pressure in a confined liquid to vary with the temperature, unless proper means are provided for compensation therefor. The principal purpose of this invention, therefore, is to provide temperature responsive means connected to the fluid pressure confining system and adapted to vary the volume of such liquid confining system upon variations in temperature, the variation in volume being such as to maintain the pressure constant regardless of such variations in temperature.

A further object of the invention is to provide improved means for creating liquid pressure by the action of mechanical force.

The accompanying drawings illustrate an embodiment of my invention and the utilization thereof in connection with a continuous weighing apparatus such as shown in my aforesaid application, and referring thereto:

Fig. 1 is a side elevation of my improved device for creating liquid pressure by the action of mechanical force, with a temperature compensating device according to my invention connected thereto.

Fig. 2 is a plan view of the parts shown in Fig. 1.

Fig. 3 is a vertical section on line 3—3 in Fig. 1.

Fig. 4 is a vertical section on line 4—4 in Fig. 2.

Fig. 5 is a vertical section on line 5—5 in Fig. 1.

Fig. 6 is a perspective view of an apparatus for the continuous weighing of materials, showing the use of liquid pressure means according to my invention in connection therewith.

The liquid pressure force transmitting system is shown as including a liquid pressure creating device 1 adapted to be subjected to a mechanical force and to create variable liquid pressure therein in response to variations of such force, and a measuring (recording or indicating) device 2 connected by pipe 3 to said pressure creating device so as to be operated by the resulting variations in liquid pressure. The pressure creating device 1 is shown as comprising a cylindrical casing 5 supported by bracket 6 or other suitable fixed supporting means and a metal bellows element 7 rigidly secured at one end to a normally fixed head member 8 and connected at its other end to an end plate 9. Said end plate is provided with a bearing member of relatively small surface, such as a steel ball 11 adapted to be engaged by any suitable means, such as bar 12 for application of mechanical force thereto. The bellows element 7 may be formed of any suitable flexible metal, such as brass or copper, and is sufficiently thin walled to provide the desired flexibility.

The bellows element may advantageously be provided with means for holding the head member 8 in fixed position against any force of a magnitude such as is to be transmitted by the system, while permitting such head member to yield in the event of application of an excessive force to the bellows element, in order to prevent damage to said bellows element. For this purpose a coiled compression spring 14 may be provided between the head member 8 and a relatively fixed head member 15. A threaded stem 16, formed integrally with or secured to the head member 8, is freely movable through opening 17 in member 15, and lock nuts or collars 18 are threaded on said stem and are adapted to abut against the outer face of member 15. By tightening up on the adjusting collars 18, any desired compression may be applied to spring 14, such compression being so adjusted that a force greater than that intended to be transmitted by the system is required to effect any further compression of said spring. The end member 9 at the bottom of the bellows element is permitted to move throughout a range corresponding to all normal movements of the bellows element due to application of forces within the range to be transmitted, but suitable positive stop means are preferably provided for limiting the upward movement of said member upon application of excessive force thereto. For this purpose the member 9 may be provided with a tapered or inclined face 19 adapted to engage a similarly tapered or inclined seat 21 at the lower end of cylindrical casing 5. The amount of movement of member 9 which is permitted before engagement with seat 21 may be adjusted by screwing head 15 into or out of the cylindrical casing 5 in which it is threadedly mounted as shown at 22.

The pressure responsive device, operable by pressure transmitted thereto from the pressure creating device, is shown as comprising a liquid pressure gauge 2 of the recording type. Said gauge is provided with an arm 25 pivoted at 26 and provided at its outer end with a pen, stylus or other recording element adapted to inscribe a curve or record upon a suitable chart rotatably mounted within casing 27 and operated by suitable clockwork mechanism in the usual manner of such devices. It will be further understood that said gauge may be provided with any suitable or usual form of pressure responsive element operatively connected to arm 25 and having a liquid receiving space connected by tubing 3 to a passage 28 leading through stem 16 to the interior of the bellows element 7. The tubing 3 is formed of material sufficiently strong and rigid to withstand any liquid pressure developed within said bellows element without deformation of the walls of such tubing.

In order to compensate for variations in volume of the liquid in the system due to changes in temperature and thus prevent such temperature changes from effecting the pressure, suitable temperature responsive compensating means are provided for automatically varying the volume of the liquid confining system in proportion to the variation in the volume of the liquid at constant pressure. Such means may comprise, as shown particularly in Figs. 1, 2, 4 and 5, a small bellows element 31 similar to the bellows element 7, secured between end members 32 and 33. The member 32 may be provided with the stem 34 connected to a branch 3a of the tubing 3, a passage 35 leading through said stem to establish communication between said tubing and the interior of the bellows element 31. The end member 33 may be provided with a boss 36 to which are secured two parallel bars 37 of a metal having a relatively low temperature coefficient of expansion. Said bars may, for example, be formed of invar metal which has substantially zero coefficient of expansion within the ordinary range of temperatures. Two other bars 38, formed of some metal such as aluminum having a higher coefficient of expansion than the bars 37, are secured at one end to a fixed plate 39, said plate 39 being mounted in any suitable manner upon bracket 6. At a suitable distance from the plate 39, the bars 38 are connected by clamping means 41 to the bars 37, and in order to permit adjustment of said clamping means the same may be split or slotted as indicated at 42 and provided with suitable tightening bolts 43 so as to clamp the bars 37 and 38 tightly between the several sections of said clamping means when said bolts are tightened but to permit the clamping means to be moved inwardly and outwardly upon the bars when said bolts are loosened. The effective length of bars 38 may thus be adjusted so as to produce any desired rate of change of volume of the bellows element 31 with changes in temperature.

The length of the bellows element 31 and consequently its volume at any given temperature is also preferably adjustable. For this purpose the stem 34 may be threaded and a screw collar 45 may be provided thereon, said collar bearing against the face of plate 39 and having an externally threaded stem portion 46 projecting through an opening 47 in said plate. A second screw collar 48 is threadedly mounted on the projecting stem portion 46 at the other side of said plate from the collar 45. The collar 45 may be screwed in or out on stem 34 to any desired position and the collar 48 may then be tightened to clamp plate 39 between the two collars. The position of the outer ends of the bellows element 31 being fixed by the position of clamping means 41 on the arms 37 and 38, this adjustment of collars 45 and 48 determines the position of the inner end of the bellows element and consequently the cubical contents thereof. A lock nut 49 may also be threadedly mounted on stem 34 to hold the collar 45 in adjusted position thereon.

Tube 3, the interior of bellows elements 7 and 31, and the passages 28 and 35 connecting said tubing to said bellows elements, as well as the pressure element of the recording gauge 2, are all completely filled with water or any other suitable liquid. Short branch tubes 3b and 3c are also shown, one for connection to a vacuum pump for exhausting the air from the system and the other for connection to means for supplying water or other liquid thereto, said branch tubes being thereafter sealed off in any suitable manner.

The member 12, which is adapted to exert an upward thrust against the lower end of the pressure creating device 1 may be a member operated by any force which it is desired to measure. In the present instance such member is shown as connected to an apparatus for the continuous weighing of materials, the upward thrust exerted thereby being dependent on the weight of material passing over such apparatus. Such continuous weighing apparatus is shown as comprising balance means including a frame 51 consisting of two side members 51a connected together by an end member 51b, said frame being pivotally supported on a shaft 52 extending through bearing means 53 on the respective side members 54a of a fixed supporting frame 54, said fixed supporting frame further comprising an end member 54b connecting together the two side members thereof. Said fixed supporting frame may be mounted on any suitable support, such as a concrete floor indicated at 55. A conveying means, consisting for example of a short endless conveyor belt 57, runs over pulleys 58 and 59. The pulley 58 is shown as mounted in bearing means 60 on the side members 51a while the pulley 59 is mounted on bearing blocks 61 sliding in grooves 62 in said side members and provided with spring 63 for pressing outwardly on said bearing blocks to maintain the desired tension on the conveyor belt 57 at all times. A constant speed electric motor 64 is mounted upon a supporting platform 65 connected to the side frame members 51a and is connected through suitable reducing gear means indicated at 66 to shaft 67 which is in turn connected through sprocket 68, chain 69 and sprocket 70 with the conveyor drive pulley 58. Means are provided for delivering the material to be weighed onto the conveying member 7 directly above the pivotal supporting shaft 52 of the balance means. Such delivering means may comprise, for example, a chute 72 opening at its lower end directly above this portion of the conveyor belt. The lower end of said chute is shown as provided wtih suitable housing means 73 fitting closely over the upper run of the conveyor belt but having an opening 74 at the side toward the direction in which the conveyor belt moves, as indicated by the arrow at 75. From the discharge end of the belt, that is, the end extending over pulley 59, the material is delivered to any suitable means. For example, such material may pass through opening 76 in the floor 55 into chute 77 for conducting the same to any desired point.

In the operation of the apparatus above described, the material to be weighed, consisting for example of powdered or crushed material, is delivered through chute 72 onto the conveyor belt 57 directly above the pivotal supporting shaft 52. Such material is carried away by the belt and delivered through opening 76 and chute 77. The weight of the material on the conveyor belt at any instant exerts a turning moment upon the balance means which tends to raise the other end of said balance means. The member 12, which is shown as connected to the end frame member 51b of the balance means is thus caused to exert a force against the lower end member 9 of the pressure creating device and compress the bellows element 7. The pressure througout the confined body of liquid is thus increased, such pressure being communicated through tubing 3 to the pressure recording means 2 and causing corresponding movement of arm 25 so that the recording means on said arm inscribes a record of the pressure in the system, in the well known manner of such recording devices. It will be seen that the pressure thus created by the bellows element and communicated through pipe 3 and recorded by the recording device 2 is dependent upon the upward thrust exerted by member 12 and hence upon the weight of material on the conveyor belt, so that the curve traced by the recording device furnishes a record of the weight of material passing over the balance means during any certain time interval. The bellows element 7 may be of such dimensions in proportion to the total volume of the liquid system that only slight movement of the end member 9 is required to produce considerable variation in liquid pressure, sufficient to move the arm 25 of the recording device through its entire range of movement. In case an excessive weight should be inadvertently applied to the balance means, or if for any other reason the thrust member 12 should be forced upwardly with a greater force than that intended to be transmitted by the liquid pressure, the spring 14 will yield upwardly under such excessive force and prevent damage to the bellows element. Moreover, when such excessive force becomes sufficient to compress spring 14 to a certain extent, the end member 9 will be brought into engagement with seat 21, thus preventing any further operation of the pressure creating device. It will be seen that the spring 14 and the stop means provided by seat 21 constitute important factors in the prevention of injury to the bellows element or to other parts of the apparatus.

In case of variations in temperature due, for example, to changes in the atmospheric temperature surrounding the apparatus, the temperature compensating device will automatically compensate for such variation in temperature and prevent the same from having any effect on the pressure in the liquid confining system. For example, in case of increase in temperature the bars 38, having a higher coefficient of expansion, will undergo a greater increase in length than the bars 37, and since said bars are tied together by the clamping means 41, the bellows element 31 will thus be elongated causing an increase in volume in the interior thereof. This increase in volume is just sufficient to permit sufficient expansion of the liquid in the system so as to maintain the pressure thereof constant insofar as any effect of temperature thereon is concerned. It will be evident by moving the clamping means 41 inwardly or outwardly on the bars 37 and 38, the length of bars 38 between said clamping means and the fixed supporting plate 39 may be so adjusted as to cause any desired rate of elongation or contraction of the bellows element with variations in temperature so as to provide the automatic compensation as above described.

While I have shown the liquid pressure force transmitting means as employed in connection with a weighing apparatus, and operating a recording gauge, it is evident that it may also be used for other purposes where it is desired to obtain an accurate indication or record of a variable mechanical force, at a point removed from the point where such force is exerted. In general the pressure creating device 1 may be mounted for actuation by any member adapted to exert a mechanical force thereon, while the pressure responsive device may be any device having a member movable by variations in the liquid pressure delivered thereto. In any such system the confined liquid acts as a medium for transmitting variations in mechanical force, through the agency of liquid pressure, such pressure being again re-converted to a mechanical force at the other end of the system.

I claim:

1. An apparatus for transmission of force by liquid pressure comprising means confining a body of liquid, means operable by mechanical force to vary the pressure in said body of liquid, pressure responsive means operable by the pressure in said body of liquid and temperature responsive means connected to said liquid confining means and operable to automatically vary the volume thereof, upon variation in temperature, the variation in volume being such as to prevent substantial variation in pressure in the body of liquid by reason of such variation in temperature.

2. In combination with a liquid pressure system for transmission of mechanical force, a temperature compensating device connected to said liquid pressure system and operable in response to variation in temperature to automatically vary the volume of the liquid contained in said system and prevent substantial variation in pressure in said system due to such temperature variation.

3. A temperature compensating device for liquid pressure systems comprising means including a chamber, means connecting said chamber to said liquid pressure system, and means operable in response to variation in temperature to automatically produce a variation in volume of said chamber substantially proportional to the variation in temperature.

4. A temperature compensating device for fluid pressure force transmitting systems comprising a bellows element, members of relatively high and relatively low temperature coefficients of expansion connected to the respective ends of said bellows element, and means connecting together said members at points removed from the connection thereof to said bellows element.

5. A device as set forth in claim 4 and comprising in addition, means for adjusting the position of said connecting means on said members with respect to said bellows element.

6. A device as set forth in claim 4 and comprising, in addition, means for adjusting said bellows element with respect to said members.

7. A device for creating fluid pressure in response to the action of mechanical force comprising a bellows element provided with end members, one of said end members being adapted for application of mechanical force thereto, and means engaging the other of said end members and resiliently opposing the mechanical force to be applied to said first named end member, the opposing force of said resilient means being greater than the mechanical forces under which the device is normally intended to operate.

8. A device for creating liquid pressure by the action of mechanical force comprising a bellows element having relatively fixed and relatively movable end members, said relatively movable end member being adapted for action of mechanical force thereagainst to compress said bellows element, and fixed stop means in position to be engaged by said movable end member upon a certain movement of said end member in excess of the normal movement thereof under mechanical forces under which the device is intended to operate.

In testimony whereof I have hereunto subscribed my name this 1st day of August, 1929.

ROBERT T. KNAPP.